Oct. 13, 1964 E. F. BROWN 3,153,207

MEANS FOR IMPROVING THE QUALITY OF RECEIVED TELEVISION IMAGES

Filed Oct. 31, 1961

INVENTOR
E.F. BROWN
BY Harry C. Hart
ATTORNEY

United States Patent Office 3,153,207
Patented Oct. 13, 1964

3,153,207

MEANS FOR IMPROVING THE QUALITY OF RECEIVED TELEVISION IMAGES

Earl F. Brown, Piscataway Township, Middlesex County, N.J., assignor to Bell Telephone Laboratories, Incorporated, New York, N.Y., a corporation of New York Filed Oct. 31, 1961, Ser. No. 148,970
3 Claims. (Cl. 333—70)

Figures 1, 2:
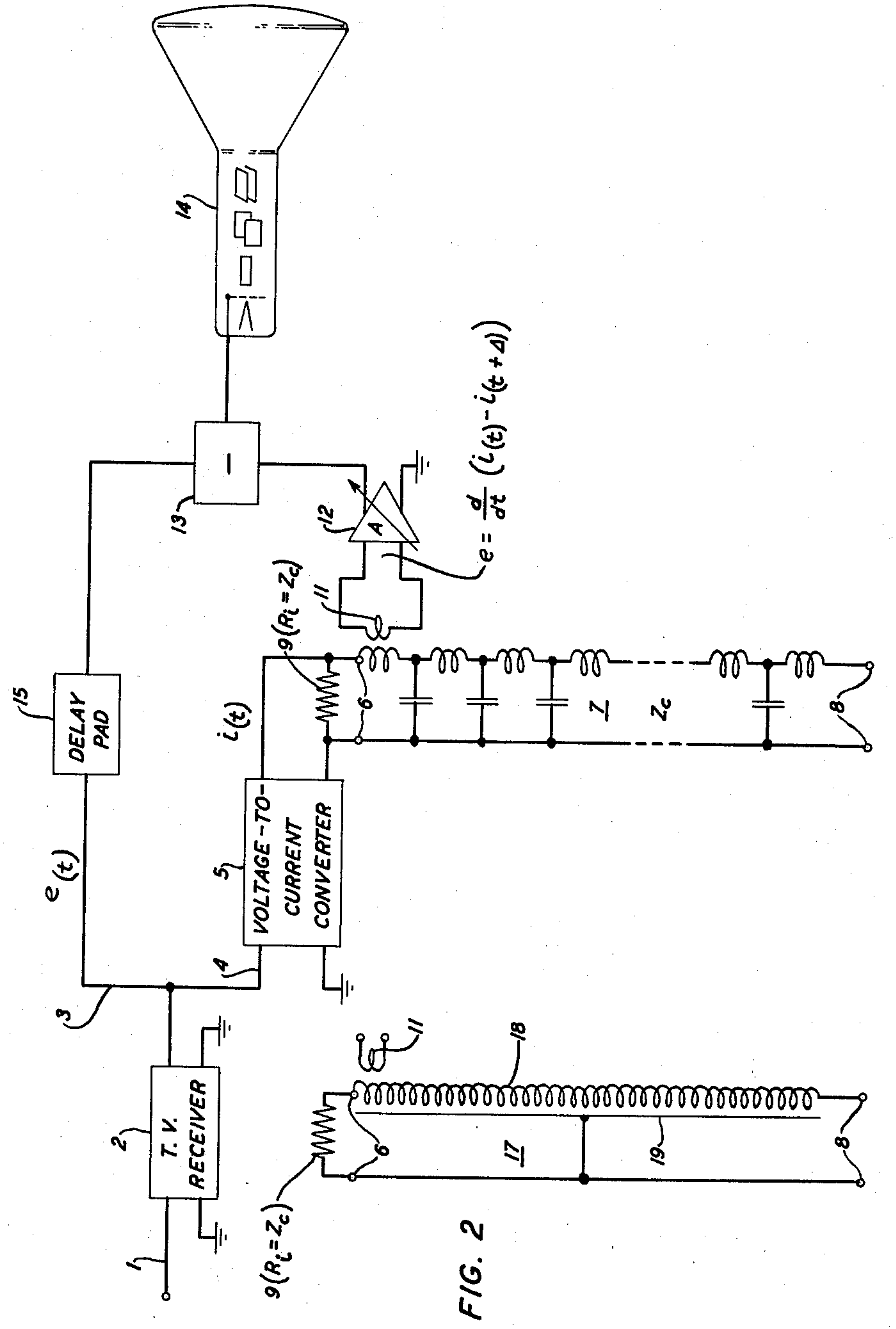

This invention deals with the reconstitution of a picture from a degraded image signal, and particularly with the generation, locally within television receiver apparatus, of an auxiliary signal which, when combined with the degraded signal, tends to offset the degradation.

In the development of an image signal from a scene to be transmitted and the transmission of such image signal to a receiver station practical considerations impose restrictions on the dimensions of the scanning element or "aperture" and on the width of the available frequency band on the transmission channel. These restrictions make for attenuation of the higher component frequencies of the image signal as compared with the lower ones and hence for degradation of the quality of the reproduced image. This degradation manifests itself chiefly as a reduction in the sharpness of brightness transitions, i.e., from black to white or from white to black, in the reconstituted image, as compared with the sharpness of the corresponding transitions in the original scene.

It is known that degradation of this character can be compensated, at least partially, by the combination, at the receiver station, of an auxiliary signal of appropriate form with the degraded incoming vision signal, that the auxiliary signal can be derived from the degraded incoming signal itself and that a suitable form is that of the second derivative of the degraded incoming signal, inverted in polarity. To this end the degraded incoming signal has been differentiated twice in succession and the resulting second derivative, after inversion of polarity, has been additively combined with the degraded signal. In the time dimension the degradation of the signal representing an abrupt brightness transition in the scene appears as a long "rise time"; i.e., the signal which, ideally, should jump abruptly from a level representing one brightness value to a level representing a widely different brightness value, rises gradually from the first value to the second, occupying the "rise time" to do so. When the negative second derivative is additively combined with the degraded signal, the "rise time" of the combination is substantially reduced.

In the broadcasting art, a single image transmitter serves hundreds, and sometimes perhaps thousands, of receivers. In such a situation costly transmitter apparatus, including large cameras employing scanning elements of great fineness, are economically justified and the bandwidth of the signal generated by such apparatus is very wide. The same situation justifies comparative prodigality of bandwidth on the transmission channel so that the high frequency components that carry the information as to fine detail are transmitted. Hence, the degradation is small.

It is quite otherwise, however, with the point-to-point transmission of an image signal as, for example, when the image signal transmission serves as an accompaniment to a telephone conversation; a so-called video telephone. In this context, both the transmitter apparatus and the image reconstitution apparatus must be compact and comparatively inexpensive and, to prevent costs from becoming excessive, the transmission channel allotted to the image signal must have a bandwidth no greater than that provided by a small number of conventional telephone voice channels. Hence the degradation in the received image, originating both in finite aperture size and in the restricted bandwidth of the transmission channel is substantially greater, in a practical point-to-point signal transmission system, than in an image reconstructed from broadcast signals.

Accordingly, the general object of the invention is to improve the quality of the reconstituted image in a video telephone system by reduction of the "rise time" of a degraded image signal, while a more specific object is to develop, from an incoming degraded signal, an auxiliary second derivative wave for combination with the degraded signal before application to the image reconstruction apparatus.

These objects are accomplished by the provision of a simple and compact double differentiator which, in contrast with the two single differentiator networks that operate in sequence, generates a second derivative wave at one stroke. It comprises an electromagnetic wave propagation device or delay line, the near end of which is provided with a terminating resistor which matches the characteristic impedance of the line while the far end is open-circuited, thus to make for substantially complete reflection. An auxiliary coil is juxtaposed close to the near end of the line and inductively coupled to it. This auxiliary coil is of low impedance and is conductively connected to a load whose impedance is as high as practicable. Such load appears to the auxiliary coil as a virtual open circuit. The degraded image signal, which normally appears as a voltage wave, is first converted into a current wave by a voltage-to-current converter and the current wave is launched into the delay line. As the current wave passes the auxiliary coil on its outward trip an electromotive force is generated in the auixilary coil that is proportional to the time derivative of the current. Upon reaching the far end of the delay line, the current wave is reflected with inverted polarity, returns to the near end of the line and is absorbed in the matched resistor. As it passes the auxiliary coil on its return, it gives rise to an electromotive force in the auxiliary coil that is again proportional to the time derivative of the current, the constant of proportionality being exactly the same in the two cases. The line is proportioned to provide a round-trip delay of substantially one half the "rise time" of the degraded image signal. With this proportionment, the two passes of the traveling wave, taken together, are closely equivalent to the derivative of the input current wave, while the electromotive force generated in the auxiliary winding by the two passes of the current wave, is proportional to the derivative of both of its parts and hence to the second derivative of the input current wave as a whole.

It is important that no substantial load be placed on the auxiliary winding. This may be secured by the connection of the auxiliary winding to the input terminals of a buffer amplifier of high impedance whose output voltage now has the configuration of the second derivative of the initial voltage. Its magnitude may conveniently be adjusted by proportioning the buffer amplifier to provide a desired amount of gain. The voltage that now appears on the load of the buffer amplifier may be combined, with due attention to polarity, with the voltage of the original degraded image signal and the combination, now characterized by a greatly reduced rise time, may be applied to a conventional image reproducer.

The invention will be fully apprehended from the following detailed description of an illustrative embodiment thereof taken in connection with the appended drawings in which:

FIG. 1 is a schematic circuit diagram showing a system according to the invention and including a wave propagation device comprising a plurality of discrete sections, each having series inductance and shunt capacitance; and FIG. 2 is a schematic circuit diagram showing an alternative to the wave propagation device of FIG. 1, in which inductance and capacitance are distributed from end to end of the device.

Referring now to FIG. 1, a television signal, derived at a distant point from a scene to be transmitted and degraded, either in the course of its development or its transmission or both, reaches a television receiver 2 by way of an incoming channel 1. The receiver 2 may include such detecting and amplifying components as may be necessary in the light of the transmission techniques employed.

The receiver supplies its output voltage wave $e(t)$ to two paths of which the upper one 3 is conventional. In the lower path 4 the first apparatus component is a voltage-to-current converter 5; i.e., an amplifier whose output resistance is very high compared with the resistances of all components supplied by it. Illustratively, a conventional five-electrode vacuum tube such as the 6K6 serves well. The output of this converter 5 thus takes the form of a current wave $i(t)$ of which the variations follow in all respects the variations of the input voltage $e(t)$ of the degraded signal.

This current $i(t)$ is supplied to the near end terminals 6 of a wave propagation device or delay line 7 comprising series inductance and shunt capacitance. Illustratively, the delay line 7 is shown as comprising a plurality of like discrete sections of which four are shown, the others being indicated, each having a discrete coil in series and a discrete condenser in shunt. To the far end terminals 8 of the delay line 7 no circuit element is connected. It is thus "open-circuited"; i.e., it "sees" an infinite impedance. To the near end terminals 6 of the delay line a terminating resistor 9 is connected whose resistance $R_1$ is equal to the characteristic impedance $Z_0$ of the line; i.e., the resistor 9 is matched to the line 7.

The technique of designing a wave propagation device to manifest a preassigned characteristic impedance is well known. In the present case the only requirement is that the characteristic impedance shall be many times smaller than the output resistance of the converter 5.

In order that it shall truly behave as a wave propagation device, the delay line 7 should include at least several sections per wave length of the waves with which it is intended to interact. While the degraded image signal contains, in principle, components of widely different wave lengths, only those of the shortest wave length, corresponding to the highest component frequencies, are of especial significance. Thus the line 7 should contain at least several discrete sections in a length embraced by a full wave corresponding to a degraded brightness transition.

The length of the line 7 should be proportioned to delay a wave traveling from its near end terminals 6 to its far end terminals 8 by approximately one quarter of the rise time of the degraded image signal.

A small, low impedance pickup coil 11 is disposed close to one of the series inductance coils at or close to the near end terminals 6 of the line 7 and inductively coupled to it. The terminals of this pickup coil 11 are connected to the input terminals of a buffer amplifier 12 of high input impedance. With this arrangement the auxiliary coil 11 draws substantially no current and the voltage signal applied to the amplifier 12 is exactly equal to any electromotive force that may be generated in the auxiliary coil 11. This voltage signal is brought to a suitable level by adjustment of the gain of the buffer amplifier 12 and is then combined by a subtractor 13 with the degraded voltage signal wave $e(t)$. The composite wave is now applied to the control element of a reproducer 14 which reconstitutes an image. A delay pad 15 may be included in the upper path 3 to ensure that the two components shall be combined in the proper phase relation.

To emphasize that the wave to be combined with the degraded input wave is its negative second derivative, the combining unit 13 is shown as a subtractor. Evidently an inversion of polarity of the second derivative wave prior to the combination, followed by an additive combination, produces the same result. As a practical matter, therefore, it may be preferred to effect the combination additively and to invert the polarity of the auxiliary second derivative wave, e.g., merely by interchanging the terminals of the auxiliary coil 11 at the points where they are connected to the input terminals of the buffer amplifier 12.

In operation, the converter 5 acts to translate the degraded image signal voltage wave $e(t)$ into a current wave $i(t)$ of the same form, and this current wave $i(t)$ is launched onto the delay line 7 at its near end terminals 6. It travels along the line 7 from the near end terminals 6 to the far end terminals 8 at a speed dependent on the construction of the line. Upon reaching the far end terminals 8, the current wave $i(t)$ is inverted in polarity and returns to the near end terminals where it is absorbed in the matching resistor 9. As the current wave passes through the near end inductance coil of the line on its outward trip, an electromotive force is generated in the auxiliary coil 11. This electromotive force is truly proportional to the time rate of change of the outgoing current wave and is reproduced at the output terminals of the buffer amplifier 12 as a voltage of the same form. As the polarity-inverted current wave that returns from the far end terminals 8 passes through the near end inductance coil of the line, an electromotive force is generated in the auxiliary coil 11 which is truly proportional to the time rate of change of the returning current wave. If, as is readily obtainable in practice, the losses of the line 7 are negligible and its characteristic impedance is low, the returning current differs from the outgoing current wave only in its polarity, amplitude and wave shape being substantially unaffected. Hence the electromotive force generated in the auxiliary coil 11 and the voltage output of the buffer amplifier 12 differ from those which resulted from the first pass of the current wave in polarity alone.

As a consequence of the proportionment of the delay line 7 to introduce a delay of one quarter of the rise time of the degraded image signal, the time that elapses between the first passage of the current wave through the near end coil of the line on its outward trip and the passage of the inverted reflected wave on its return trip through the same coil, is one half of the rise time. As a result of this proportionment and the polarity inversion, the two portions of the current wave in the first series inductance coil of the line, taken together, constitute an approximation, as close as may be desired, to the first derivative of the input current wave $i(t)$ itself. As a consequence of the laws of electromagnetic induction between this near end coil and the auxiliary coil 11 the voltage output of the buffer amplifier 12 is, to the same degree of approximation, the second derivative of the input current wave $i(t)$. Lastly, because the current wave $i(t)$ that is thus doubly differentiated is developed by the voltage-to-current converter 5 from the degraded input voltage wave $e(t)$ the auxiliary wave ultimately combined with the degraded voltage wave is indeed the second derivative of this voltage wave.

For best results, it is desirable, as explained above, that the round-trip delay introduced by the wave propagation device 7 shall be approximately equal to one half of the rise time of the degraded image signal voltage wave. Hence this round-trip delay depends on the fineness with which the original scene was scanned and on the frequency bandwidth of the transmission medium and should be altered if either the transmitter apparatus or the transmission channel be changed. Provided the line 7 is initially of sufficient length to cope with the longest rise time to be encountered in practice, it is a simple matter to readjust it to cope with shorter rise times, simply by redisposing the auxiliary coil 11 to be inductively coupled with the second or the third series inductance coil of the line 7, in contrast to the first. From the foregoing discussion it will be apparent that the round-trip delay of importance is from that series coil to which the auxiliary coil 11 is coupled to the far end of the line 7 and back to the same point.

For illustrative purposes the line 7 has been shown as consisting of a plurality of discrete sections. It is just as well, and may indeed be simpler, to employ a wave propagation device or delay line of the "distributed parameter" variety. Such a line is illustrated in FIG. 2, where it is designated 17. It may comprise merely a solenoid or helix 18 of wire, providing the inductance, juxtaposed with a metal plate 19 providing the capacitance. This construction has the further advantage that final adjustments of the round-trip delay by changing the location of the auxiliary coil 11 may be made with any degree of fineness.

What is claimed is:

1. In apparatus for receiving and processing an incoming voltage wave characterized by a nominally abrupt level transition that has been degraded in development or transmission, said degradation appearing as a transition of excessive rise time, an elongated electromagnetic wave propagation device having near end terminals and far end terminals and comprising series inductance and shunt capacitance distributed throughout its length, said device being proportioned to provide a round-trip wave delay, from the near end to the far end and return, of one half said rise time, a resistor, of magnitude to match the characteristic impedance of said device, connected to the near end terminals, the far end terminals being open-circuited, a low-impedance coil, of length short compared with the length of said propagation device, juxtaposed with the near end series inductance of said device and inductively coupled thereto, a high impedance load connected to said coil, means for converting said incoming voltage wave into a wave of current, means for launching said current wave into the near end terminals of said device, means for inverting the polarity of the voltage developed across said load, and means for combining said inverted load voltage with said incoming wave.

2. Apparatus for developing, from a degraded image signal voltage wave characterized by a substantial rise time, the second derivative of said wave which comprises an elongated electromagnetic wave propagation device having near end terminals and far end terminals and comprising series inductance and shunt capacitance distributed throughout its length, said device being proportioned to provide a round-trip wave delay, from the near end to the far end and return, of one half said rise time, a resistor, of magnitude to match the characteristic impedance of said device, connected to the near end terminals, the far end terminals being open-circuited, a low-impedance coil, of length short as compared to the length of said propagation device, juxtaposed with a near end series inductance of said device and inductively coupled thereto, a high impedance load connected to said coil, means for converting said degraded image signal voltage wave into a wave of current, and connections for launching said current wave into the near end terminals of said device, whereupon said wave travels to the far end of said device and returns, after one half rise time, with inverted polarity to be absorbed in said resistor, whereby an electromotive force is induced in said coil for each pass of said current wave and said electromotive forces, as combined in said load, constitute the desired second derivative.

3. Apparatus for developing, from a degraded image signal current wave characterized by a substantial rise time, the second derivative of said wave which comprises an elongated electromagnetic wave propagation device having near end terminals and far end terminals and comprising series inductance and shunt capacitance distributed throughout its length, said device being proportioned to provide a round-trip wave delay, from the near end to the far end and return, of one half said rise time, a resistor, of magnitude to match the characteristic impedance of said device, connected to the near end terminals, the far end terminals being open-circuited, a low-impedance coil, of length short as compared to the length of said propagation device, juxtaposed with the near end series inductance of said device and inductively coupled thereto, a high impedance load connected to said coil, means for launching said current as a wave into the near end terminals of said device, whereupon said wave travels to the far end of said device and returns with inverted polarity to be absorbed in said resistor, whereby an electromotive force is induced in said coil for each pass of said current wave and said electromotive forces, as combined in said load, constitute the desired second derivative.

References Cited in the file of this patent

UNITED STATES PATENTS

| | | |
|---|---|---|
| 1,315,539 | Carson | Sept. 9, 1919 |
| 2,266,154 | Blumlein | Dec. 16, 1941 |
| 2,612,603 | Nicholson | Sept. 30, 1952 |
| 2,794,173 | Ramey | May 28, 1957 |
| 2,836,715 | Spielberg | May 27, 1958 |
| 2,856,525 | Lubkin | Oct. 14, 1958 |
| 2,923,898 | Goad | Feb. 2, 1960 |

FOREIGN PATENTS

| | | |
|---|---|---|
| 207,526 | Great Britain | Sept. 11, 1924 |